March 22, 1966 — R. VÖLLER ETAL — 3,241,395

BALANCING APPARATUS FOR ROTATING ELEMENTS

Filed Nov. 12, 1963 — 3 Sheets-Sheet 1

INVENTORS:
ROLF VOLLER
WOLFGANG BRENNER
ERNST FOCKE

BY Michael J. Striker

Their ATTORNEY

March 22, 1966 R. VÖLLER ETAL 3,241,395
BALANCING APPARATUS FOR ROTATING ELEMENTS
Filed Nov. 12, 1963 3 Sheets-Sheet 2

INVENTORS:
ROLF VOLLER
WOLFGANG BRENNER
ERNST FOCKE
BY
Michael S. Striker
Their ATTORNEY March 22, 1966  R. VÖLLER ETAL  3,241,395
BALANCING APPARATUS FOR ROTATING ELEMENTS
Filed Nov. 12, 1963  3 Sheets-Sheet 3

INVENTORS:
ROLF VOLLER
WOLFGANG BRENNER
ERNST FOCKE

BY Michael J. Striker

Their ATTORNEY

_United States Patent Office_

3,241,395
Patented Mar. 22, 1966

3,241,395
BALANCING APPARATUS FOR ROTATING
ELEMENTS
Rolf Völler, Dagersheim, Wolfgang Brenner, Stuttgart-Bad Cannstatt, and Ernst Focke, Stuttgart, Germany, assignors to Fortuna-Werke Spezialmaschinenfabrik A.-G., Stuttgart-Bad Cannstatt, Germany
Filed Nov. 12, 1963, Ser. No. 322,730
Claims priority, application Germany, Nov. 13, 1962, F 38,294
25 Claims. (Cl. 74—573)

The present invention relates to the static balancing of rotary elements whilst rotating, such as grinding wheels and the like.

It is an important object of the invention to provide a balancing apparatus wherein a balancing mass may be moved with reference to the rotary elements to thereby adjust the static balance of the elements and which is contructed and assembled in such a way that the balance of such elements may be adjusted in an exceptionally simple manner and within a very wide range.

Another object of the invention is to provide a novel adjusting mechanism which may be used in a balancing apparatus of the above outlined characteristics.

A further object of the invention is to provide a novel motion transmitting connection between the adjusting mechanism and the balancing mass.

An additional object of our invention is to provide a balancing apparatus wherein the balancing mass may be readily inserted or removed with little loss in time to be replaced by a mass of greater or lesser weight.

A concomitant object of the invention is to provide a balancing apparatus for grinding wheels wherein the position of the balancing mass may be observed in all stages of adjustment and wherein the radial and angular position of the center of gravity of the balancing mass with reference to the axis of the grinding wheel may be adjusted with utmost precision.

Another object of the invention is to provide a novel transmission which prevents any unintentional adjustments in the position of the balancing mass.

A further object of our invention is to provide a balancing apparatus which occupies very little space and which may be readily utilized in many types of conventional machines wherein one or more rotary elements must be statically balanced with utmost precision.

With the above objects in view, the feature of our invention resides in the provision of a balancing apparatus for rotating elements, particularly for grinding wheels. The apparatus comprises a rotatable system including a hollow spindle and a carrier defining an internal chamber and coaxially secured to one end of the spindle, a balancing mass received in the chamber of this carrier and having a center of gravity which is movable radially and angularly with reference to the axis of the spindle, first and second adjusting means coaxially received in the spindle, motion transmitting means operatively connected with both adjusting means and arranged to move the center of gravity of the balancing means radially with reference to the axis of the spindle in response to rotation of the adjusting means in opposite directions and to move the center of gravity of the balancing mass angularly about the axis of the spindle in response to rotation of both adjusting means in the same direction, and means for rotating the adjusting means with and with reference to each other.

In accordance with another important feature of the invention, the means for rotating the adjusting means with and with reference to each other includes a specially contructed transmission which comprises a reversible motor and a pair of clutches one of which is operative when the motor drives both adjusting means in the same direction and the other of which is operative when the motor drives the adjusting means in opposite directions.

The motion transmitting means may comprise a lever which is coupled for rotation with one of the adjusting means and which may be tilted by the other adjusting means. Alternatively, the motion transmitting means may comprise an eccentric which is operatively connected with one of the adjusting means and is rotatable in an eccentric bore of the balancing mass, and a coupling which connects the balancing mass for rotation with the other adjusting means.

The novel features which are considered as characteristic of the invention are set forth in particular in the appended claims. The improved balancing apparatus itself, however, both as to its construction and its method of operation, together with additional features and advantages thereof, will be best understood from the following detailed description of certain specific embodiments with reference to the accompanying drawings, in which:

FIG. 3 is a schematic diagram showing the axis of the lever in two positions of adjustment;

FIG. 4 is a schematic diagram showing the path of one point on the axis of the lever when the lever is adjusted;

FIG. 5 is a similar diagram showing a series of paths in which a point on the axis of the lever may travel during adjustment;

FIG. 9 is an axial section through a slightly modified balancing mass and a fragmentary side elevational view of a modified lever.

Figure 1:
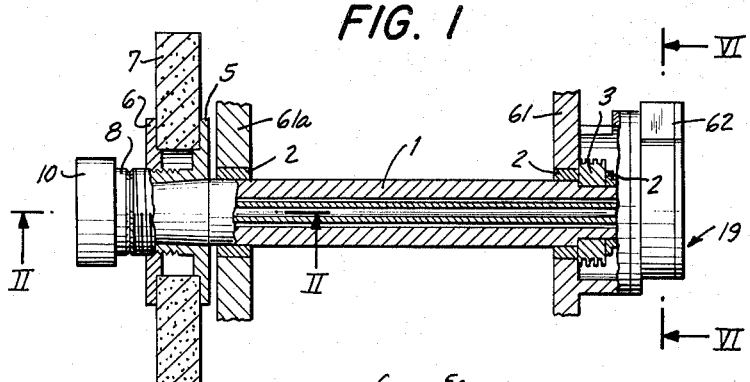
FIG. 1 is a fragmentary axial section through a grinding machine which embodies one form of the balancing apparatus.

Referring to FIG. 1, there is shown a portion of a grinding machine which comprises a rotatable system including a hollow rotary spindle 1 mounted in antifriction bearings 2 provided in frame members 61, 61a. The right-hand end portion of the spindle 1 carries a drive means here shown as a pulley assembly 3 which is rotated by a system of belts, not shown, in a manner well known in the art of grinding machines. The hollow end portion 4 of the spindle 1 is of conical shape, best shown in FIG. 2, and carries a clamping means including an annular hub member 5 which cooperates with an internally threaded clamping ring 6 to support a grinding wheel 7. The hub member 5 is provided with an externally threaded tubular portion 5a which extends through the central aperture of the grinding wheel 7 and meshes with the ring 6 to prevent wobbling of the wheel. The latter rotates with the spindle 1 because the hub member is non-rotatably fitted onto the conical end portion 4 in a manner to be presently described.

The left-hand end face of the hub member 5 is in abutment with a carrier here shown as a nut 8 whose left-hand end portion defines an internal cylindrical chamber 12 receiving with radial play a hollow cylindrical balancing mass or weight 13. A central portion of the nut 8 is provided with external facets 9 which may be engaged by a wrench or another suitable tool in order to facilitate rotation of this nut so that the latter may be screwed onto an externally threaded supporting member here shown as a plug 36 which is rigidly but detachably fixed to the end portion 4. Thus, when the nut 8 is driven home, its shoulder 8a abuts against the left-hand end face of the hub member 5 and maintains the latter in strong frictional engagement with the conical end portion 4 so that the grinding wheel 7 is compelled to share all angular movements of the spindle 1. The nut 8 is provided with external threads to take a screw cap 10 which closes the left-hand end of the chamber 12 and which is formed with one or more windows 11 so that the operator may observe the position of the mass 13.

The spindle 1 accommodates a coaxial adjusting shaft 15 one end of which extends into the conical end portion 4 and the other end of which extends into the transmission case 62 of an adjusting mechanism generally indicated by the numeral 19, see FIG. 1. This shaft 15 is telescoped into but is rotatable with respect to an elongated adjusting sleeve 16 which extends with play through the bore 26 of the spindle 1. The shaft 15 and the sleeve 16 may be rotated with or relative to each other to adjust the radial and angular position of the balancing mass 13 in the chamber 12.

Figure 2:
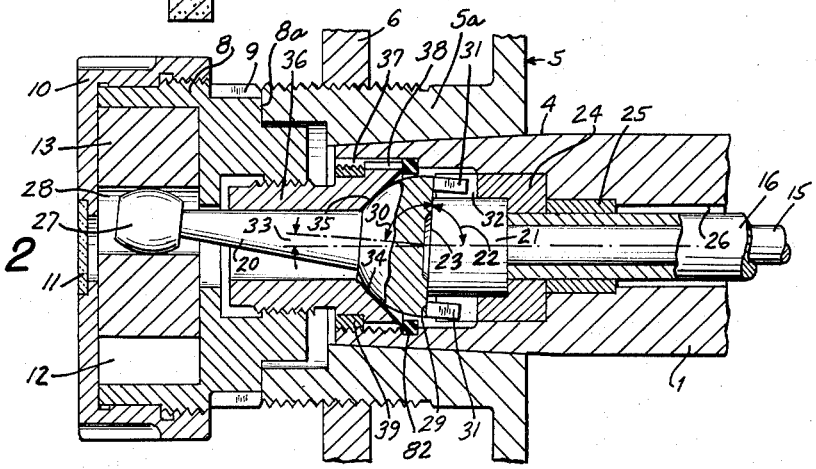
FIG. 2 is an enlarged axial section through the left-hand part of the structure shown in FIG. 1, illustrating the balancing mass, the motion transmitting lever and the parts which directly support and move this lever.

In the embodiment of FIGS. 1 and 2, the means for transmitting motion from the shaft 15 and sleeve 16 to the mass 13 comprises a specially configured lever or arm 20 the right-hand end portion 34 of which is of spherical shape and is free to swivel in a conical socket 35 defined by the plug 36. For convenience, the end portion 34 of the lever 20 will be called a cam element and this cam element is provided with a flat cam face 29 whose plane is inclined with reference to the axis of the lever 20 (see the angle 30 in FIG. 2). The cam face 29 abuts against a similarly inclined cam face 23 on a cylindrical cam element or boss 21 which is rigidly secured to and forms part of the adjusting shaft 15. The plane of the cam face 23 is inclined with reference to the axis of the shaft 15 through an angle 22 whose magnitude is the same as that of the angle 30. The cam element 21 is rotatable in a cylindrical coupling element 24 which is rigidly fixed to the left-hand end portion of the adjusting sleeve 16 and which is rotatable in a central bore provided in the conical end portion 4 of the spindle 1. The sleeve 16 is centered by a cylindrical muff 25 so that the common axis of the shaft 15 and sleeve 16 coincides with the axis of the spindle 1. The left-hand end portion of the coupling element 24 is provided with a plurality of equidistant recesses or pockets 32 each of which receives without angular play a claw 31 extending beyond the cam face 29 of the cam element 34. Thus, the coupling including the element 24, the recesses 32 and the claws 31 compels the lever 20 to share all angular displacements of the adjusting sleeve 16 but the lever is free to wobble with respect to the sleeve because the claws 31 may extend more or less into the respective recesses 32. Such wobbling or tilting of the lever 20 may be caused by the cam element 21 in response to rotation of the adjusting shaft 15 relative to the sleeve 16.

The left-hand end portion 27 of the lever 20 assumes the form of a barrel (hereinafter called head) which may swivel in a cylindrical central bore 28 of the balancing mass 13. As shown in FIG. 2, the head 27 may rotate and may move axially in the bore 28 but is mounted without any radial play so that any radial or angular displacement of the lever 20 immediately causes corresponding adjustment in the position of the balancing mass 13. It goes without saying that the head 27 may be of truly spherical shape as long as the bore 28 is bounded by a cylindrical surface of constant diameter.

Whenever the adjusting shaft 15 rotates relative to the adjusting sleeve 16 or vice versa, the lever 20 is caused to wobble and its axis describes a conical surface whose apex is located in the plane of the cam face 23. When the lever 20 is turned through 180 degrees with reference to the position of FIG. 2 while the cam element 21 remains stationary, the angles 22, 30 are located diametrically opposite each other and the axis of the lever then coincides with the axis of the adjusting shaft 15. This is the zero position of the adjusting mechanism and the inclination of the axis of the lever 20 remains unchanged if the shaft 15 and the sleeve 16 are thereupon rotated at the same speed and in the same direction. If the axes of the lever 20 and shaft 15 make an acute vectorial angle 33 (shown in FIG. 2), and if the sleeve 16 and shaft 15 thereupon rotate in the same direction and at identical speeds, the head 27 will travel in a circular path so that its center remains equidistant from an extension of the axis of the spindle 1.

In order that the balancing apparatus may operate with requisite precision, it is necessary to make sure that the cam face 29 remain in permanent abutment with the cam face 23, i.e., the lever 20 may rotate and should be free to wobble with respect to the cam element 21 but must be prevented from moving axially relative to the shaft 15. This is achieved by holding the spherical surface of the cam element 34 in permanent abutment with the conical socket 35 in the right-hand end portion of the plug 36. The plug is provided with one or more axially parallel peripheral teeth 38 which are slidable in complementary axially parallel grooves 37 machined into the internal surface of the conical end portion 4 and abutting against an elastic gasket 82 which is adjacent to an internal shoulder of the spindle 1. The terminal part of the conical end portion 4 is provided with internal threads to take a ring nut 39 which compels the teeth 38 to bear against the gasket 82 so that the socket 35 is in permanent abutment with the cam element 34. The teeth 38 and grooves 37 insure that the plug 36 is held against rotation with respect to the spindle 1 which is necessary because the plug supports the nut 8 in such a way that the shoulder 8a bears against the end face of the hub member 5. The cam element 21 has an annular end face which abuts against an internal shoulder of the coupling element 24 so that this cam element cooperates with the plug 36 to prevent any axial displacements of the lever 20.

FIG. 3 illustrates the manner in which the lever 20 may be adjusted angularly and/or axially in response to rotation of the adjusting shaft 15 and/or sleeve 16. It is now assumed that the shaft 15 is stationary so that its cam element 21 is held against rotation. The axis 51 of the lever 20 coincides with the axis of the cam element 21 and a point 52 on the axis 51 (which point is located in a plane 13a) remains stationary. The plane 13a passed through the center of gravity of the balancing mass 13. If the operator thereupon decides to rotate the sleeve 16 and the coupling element 24, the cam element 34 shares such rotary movement and the point 52 will travel along an arc 53 in a circular path to assume the position 55 when the cam element 34 is rotated through 180 degrees. This is shown in FIG. 4 which is a front elevational view of the plane 13a. The axis 51 of the lever 20 then assumes the position 51'.

If the operator thereupon decides to hold the cam element 34 against rotation and to rotate the cam element 21, the point 52 will begin to travel back along the arc 53 and will return from the position 55 to the position 52.

In FIG. 5, which is an end view of the cam element 21, the arc 54 corresponds to the arc 53 of FIG. 4. If the cam element 34 is caused to rotate with respect to the cam element 21 in a different inclined position of the lever 20, the point 52 on the axis 51 will travel in different arcuate paths two of which are shown in FIG. 5 by circles 54a, 54b. If the shaft 15 and sleeve 16 are rotated in opposite directions but through equal angles, the point 52 will travel along a diametral line 56—56 to assume intermediate positions 58, 57 and to finally reach the position 55. Each of the positions 55, 57, 58, represents a vector quantity whose magnitude changes but whose direction (position in space) remains the same.

If the cam elements 21, 34 are caused to rotate in the same direction, the direction of the balancing force will change but the magnitude of this force remains unaltered. The circles 59 and 60, shown in FIG. 5, indicate the travel of the point 52 in the position 57 or 58 when the cam elements 21, 34 rotate in the same direction. The axis 51 of the lever 20 then swivels about a point located in the plane of the cam faces 23, 29.

Figure 6:
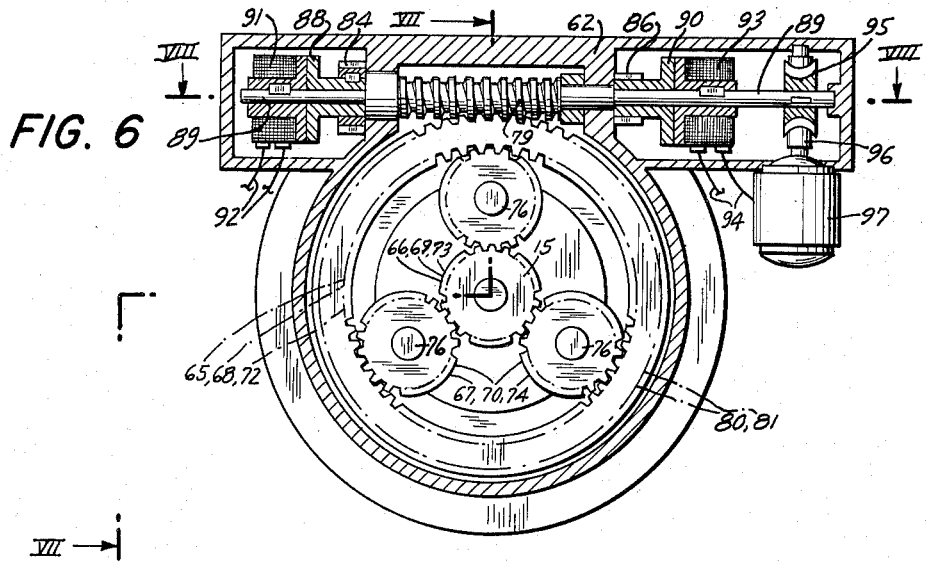
FIG. 6 is an enlarged transverse section through the transmission case of the adjusting mechanism as seen in the direction of arrows from the line VI—VI of FIG. 1.
Figure 8:
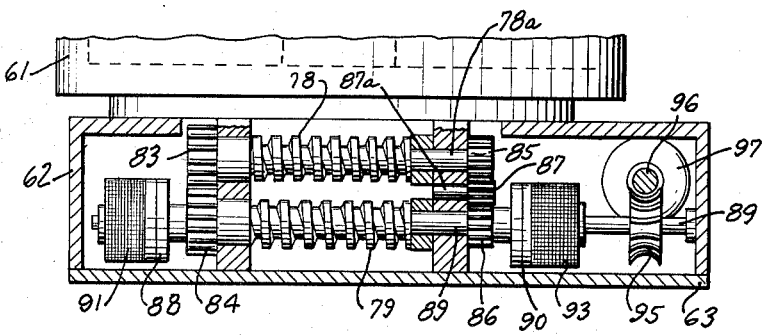
FIG. 8 is a section as seen in the direction of arrows from the line VIII—VIII of FIG. 7.
Figure 7:
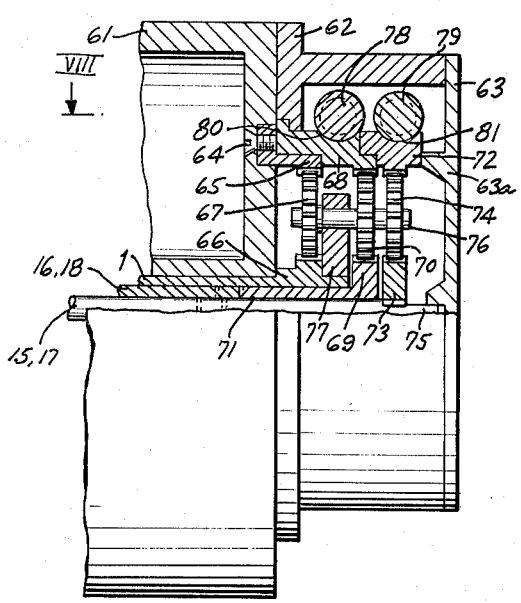
FIG. 7 is a partial axial setcion through the transmission case as seen in the direction of arrows from the line VII—VII of FIG. 6.

The remaining parts of the adjusting mechanism 19 (which includes the aforementioned shaft 15 and sleeve 16) are illustrated in FIGS. 6 to 8. The frame member 61 carries a transmission case 62 whose end is closed by a removable cover 63 and whose interior accommodates a transmission including three planetaries. The first planetary comprises a fixed ring gear 65 which is secured to the frame member 61 by screws 64, a sun gear 66 which is rigid or integral with the spindle 1, and a series of planet pinions 67 which mesh with the sun gear 66 and ring gear 65. The second planetary comprises a ring gear 68 which is rotatably received in the internal space of the case 62, a sun gear 69 which is drivingly connected with the sleeve 16 by a coupling sleeve 71, and three planet pinions 70 which mesh with the sun gear 69 and ring gear 68. The third planetary comprises a ring gear 72 which is rotatably received in the internal space of the case 62, a sun gear 73 which is drivingly connected with the shaft 15 by a coupling element 75, and three planet pinions 74. The right-hand end portion of the coupling element 75 (see FIG. 7) is rotatably supported by the cover 63.

Each planet pinion 67 is mounted on a planet shaft 76 which also carries one pinion 70 and one pinion 74 and which is journalled in a planet carrier 77. This planet carrier 77 is of annular shape and is rotatable on the spindle 1 at a point adjacent to the sun gear 66. It will be noted that the ring gears 65, 68, 72 are held against axial movement by an annular stop 63a at the inner side of the cover 63. Of course, the transmission includes a series of antifriction bearings which were omitted in our drawings for the sake of clarity. Such antifriction bearings preferably include roller bearings.

The object of the first planetary is to couple shaft 15 and sleeve 16 with spindle 1 via planet carrier 77 and the pinions 70 and 74 and to drive them with equal rotary speed and direction of rotation as spindle 1 when the adjusting mechanism 19 is idle. When the adjusting mechanism 19 is going, the motion of shaft 15 and sleeve 16 is superimposed, preceding and/or pursuing respectively, to the rotary motion of spindle 1.

The ring gear 68 is rigidly secured to or integral with a worm wheel 80 which meshes with a worm 78 on a worm shaft 78a. The ring gear 72 is also combined with a worm wheel 81 which meshes with a worm 79 on a worm shaft 89. The worm shafts 78a, 89 are parallel to each other and are journalled in suitable partitions provided in the case 62. The shaft 78a carries at its opposite ends a pair of spur gears 83, 85. The spur gear 83 meshes with an identical spur gear 84 secured to a clutch element 88 which is normally free to rotate on the worm shaft 89. The clutch element 88 constitutes the driven part of an electromagnetic clutch whose driving element 91 is rigidly fixed to the shaft 89 and is connected with conductors 92 leading to a suitable source of electrical energy, not shown. Thus, when the clutch including the clutch elements 88, 91 is energized, the spur gear 84 is coupled to the worm shaft 89 and, if the shaft 89 is driven, the worms 78, 79 are compelled to rotate at identical speed but in opposite directions.

The spur gear 85 on the worm shaft 78a meshes with an intermediate spur gear 87 on a stub shaft 87a, and the gear 87 meshes with a spur gear 86 secured to a coupling element 90 which is rotatable on the worm shaft 89. This clutch element 90 constitutes the driven part of a second electromagnetic clutch whose driving element 93 is rigidly secured to the worm shaft 89 and is connected with conductors 94. When the clutch including the clutch elements 90, 93 is energized, the spur gear 86 rotates with the worm shaft 89 and rotates the worm shaft 78a via spur gears 87, 85 in the same direction and at identical speed.

The worm shaft 89 carries a worm wheel 95 which meshes with a worm 96 provided on the output shaft of a reversible electric motor 97.

When the adjusting mechanism 19 is idle, the circuit of the motor 97 is open but the clutches 88, 91 and 90, 93 are operative to block the ring gears 68 and 72 of the second and third planetaries and to prevent unintentional adjustments of the lever 20. The worm wheels and the corresponding worms constitute self-locking devices which prevent any, even small, changes in angular position of the shaft 15 and sleeve 16.

If the operator desires to rotate the shaft 15 and sleeve 16 in the same direction, the clutch element 91 is deenergized and the circuit of the motor 97 is completed whereby the clutch element 88 is disconnected from the worm shaft 89 and the worm shaft 78a is driven through the spur gears 86, 87, 85 to rotate in the same direction and at the same speed as the worm shaft 89. The worms 78, 79 change the angular position of the rotary ring gears 68, 72 and the pinions 70, 74 compel the sleeve 16 and shaft 15 to rotate in the same direction. This means that the axis 51 of the lever 20 will travel along the mantle of a cone but the extent of its inclination remains unchanged so that the distance between the axis of the spindle 1 and the center of gravity of the balancing mass 13 is not changed.

If the operator desires to move the balancing mass 13 in a direction toward or away from the axis of the spindle 1, the shaft 15 and sleeve 16 must rotate in opposite directions. This is achieved by deenergizing the clutch element 93 and by starting the motor 97 whereby the clutch element 90 is not compelled to shart in rotation of the worm shaft 89 but the clutch element 88 drives the spur gear 84 which in turn rotates the worm 78 via spur gear 83 at the same speed but in opposite direction. The ring gears 68, 72 are caused to rotate in opposite directions and the axis 51 of the lever 20 will travel in diametral plane 56—56 which passes through the common axis of the shaft 15 and sleeve 16. Such adjustment either increases or reduces the distance between the axis of the spindle 1 and the center of gravity of the balancing mass 13.

Since the motor 97 is reversible, it may adjust the angular position of the axis 51 in a clockwise or anticlockwise direction, depending upon whether the shaft 15 and sleeve 16 rotate at the same speed in a clockwise or counterclockwise direction. This will not change the vectorial angle 33 but merely the angular position of the balancing mass 13 with reference to the nut 8 and grinding wheel 7. If the motor 97 drives the worm shaft 89 in a clockwise direction and the shaft 15 rotates counter to the sleeve 16, the center of gravity of the balancing mass 13 will travel toward the axis of the grinding wheel 7 whereas, when the motor 97 drives the worm shaft 89 in a counterclockwise direction and the shaft 15 rotates counter to the sleeve 16, the center of gravity of the balancing mass 13 will be shifted toward the axis of the grinding wheel.

The feature that the electromagnetic clutches 88, 91 and 90, 93 are normally operative when the motor 97 is idle is of considerable advantage because the motor cannot rotate the shaft 15 and sleeve 16 even if its circuit is completed as long as both clutches remain connected to the source of electrical energy, i.e., as long as the clutch elements 91, 93 remain energized. This will be readily understood since the clutch elements 88, 90 would tend to rotate the worm shaft 78a simultaneously in a clockwise and counterclockwise direction. In other words, in order to effect any adjustment in the position of the balancing mass 13, it is necessary to deenergize one of the clutch elements 91, 93 and to thereupon start the motor 97 which may drive the worm shaft 89 through the self-locking means including the worm wheel 95 and worm 96.

Of course, it is possible to replace the electromagnetic clutches of FIGS. 6 to 8 by another type of self-locking means which prevents unintentional adjustments in the angular position of the shaft 15 and sleeve 16. However, it has been found that the clutches 88, 91 and 90, 93 constitute an extremely simple and highly satisfactory blocking device which will effectively prevent any unintentional adjustments as long as each thereof is energized, regardless of whether the motor 97 is idle or not.

FIG. 9 illustrates a slightly modified mass 13' whose central bore 28' is of polygonal cross section but its cross-sectional area is constant from the one to the other axial end thereof. The head 27' of the lever 20' is polygonal and is bounded by rounded facets which engage the corresponding facets of the internal surface surrounding the bore 28'. The construction shown in FIG. 9 is of particular advantage when the grinding wheel 7 is set in motion because the coupling between the mass 13' and the lever 20' is more reliable.

Figure 10:
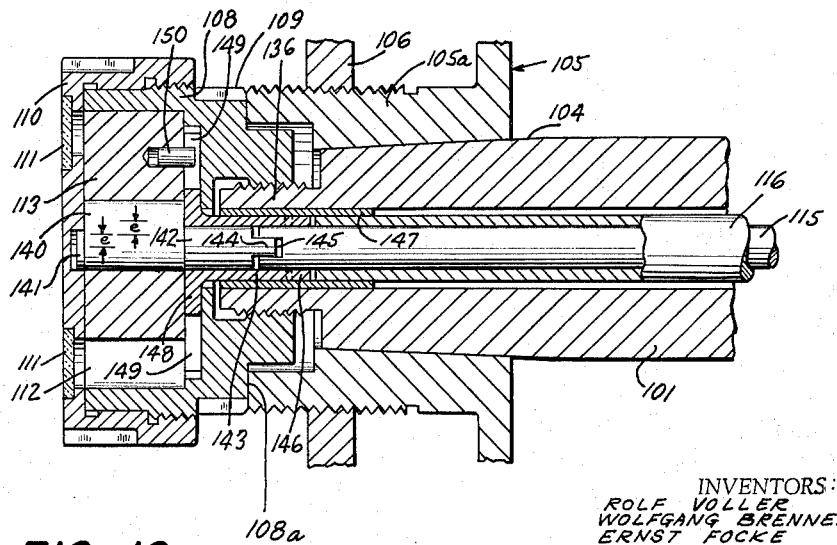
FIG.10 is a fragmentary axial section through a modified balancing apparatus wherein the lever of FIGS. 1–2 and 9 is replaced by a different motion transmitting device.

Referring finally to FIG. 10, there is shown a portion of a modified grinding machine wherein the lever 20 or 20' is replaced by a composite motion transmitting device which serves to change the radial and angular position of a balancing weight or mass 113. The conical end portion 104 of the spindle 101 is provided with an integral supporting member or plug 136 which is screwed into a carrier or nut 108. The nut 108 has external facets 109 and its shoulder 108a abuts against the tubular portion 105a of the hub member 105 which cooperates with a clamping ring 106 to hold a grinding wheel (not shown) in the same way as described in connection with FIGS. 1 and 2. The nut 108 defines an internal chamber 112 for the balancing mass 113, and the end of the chamber 112 is closed by a screw cap 110 which is provided with observation windows 111.

The plug 136 receives a centering muff 147 for the adjusting sleeve 116, and this sleeve is telescoped onto but may rotate with respect to an adjusting shaft 115. The left-hand end portion of the shaft 115 is provided with recesses 145 which receive complementary claws 144 provided at the inner end of a coupling element 142 which carries an eccentric cylindrical head 140 snugly fitted into an eccentric bore of the mass 113. The eccentricity e of the bore in the balancing mass 113 is the same as the eccentricity e of the head 140. The coupling element 142 comprises a cylindrical extension 141 which extends outwardly and beyond the head 140 to be received in a central bore of the screw cap 110.

The left-hand end portion of the sleeve 116 is formed with axially inwardly extending recesses for claws 146 provided at the inner end of a hollow cylindrical coupling element 143 which is formed with a radially outwardly extending collar 148 having radial slots 149 for an axially parallel pin 150 provided in a blind bore machined into the rear end face of the balancing mass 113. In order to make sure that the balancing action of the mass 113 is sufficiently accurate, the slots 149 are distributed symmetrically with reference to each other and the mass of the pin 150 corresponds exactly to the mass of that material which is removed to form the blind bore for this pin.

The manner in which the balancing mass 113 is adjustable by the shaft 115 and/or sleeve 116 is analogous to the manner described in connection with FIGS. 1 to 8. Thus, the shaft 115 will rotate the eccentric 140 via coupling 144, 145 to move the mass 113 radially inwardly or outwardly. The sleeve 116 will rotate the mass 113 via coupling 146, 148, 149, 150 to change the angular position of the mass. The shaft 115 and sleeve 116 may rotate in the same direction and in opposite directions, at identical speeds. The nature of adjustments is exactly the same as described in connection with FIGS. 3 to 5. Also, the shaft 115 and sleeve 116 may be rotated by a transmission including a series of planetaries in the same way as described in connection with FIGS. 6 to 8.

If the operator finds that the weight of the balancing mass 13, 13' or 113 is excessive or too small for proper balancing of a particular grinding wheel, he removes the cap 10 or 110 and replaces the balancing mass by a heavier or lighter mass. It is equally possible to assemble the balancing mass of several sections which may be taken apart to change the overall weight of that portion of the mass which is placed into the chamber 12 or 112.

The person in charge may gain access to the motion transmitting part or parts of the balancing apparatus by removing the nut 8 or 108. The bore in the plug 36 of FIG. 2 is large enough to permit passage of the head 27 or 27'. Since the mass of the nut 8 or 108 is important for proper operation of the balancing apparatus, the latter may be furnished with a set of such nuts.

The grinding wheel may be removed in a very simple manner because the clamping ring 6 or 106 may be separated from the hub member 5 or 105 upon detachment of the nut 8 or 108. Thus, a defective grinding wheel may be replaced with little loss in time despite the fact that the end portion 4 or 104 of the spindle accommodates the motion transmitting device.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A balancing apparatus for rotating elements, comprising a rotatable system including a hollow spindle and a carrier defining an internal chamber and coaxially secured to said spindle; a balancing mass received in said chamber and having a center of gravity movable radially and angularly with respect to the axis of said spindle; first and second adjusting means coaxially received in said spindle; motion transmitting means operatively connected with both said adjusting means and arranged to move the center of gravity of said mass radially with reference to the axis of said spindle in response to rotation of said adjusting means relative to each other and to move said center of gravity angularly about the axis of said spindle in response to rotation of said adjusting means together with each other; and means for rotating said adjusting means together with or relative to each other.

2. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with reference to the axis of said spindle; a first adjusting member including a rotary shaft coaxially received in said spindle; a second adjusting member including a rotary sleeve received in said spindle and coaxially receiving said shaft; motion transmitting means operatively connected with said adjusting members and arranged to move the center of gravity of said mass radially with reference to the axis of said spindle in response to rotation of said adjusting members relative to each other and to move said center of gravity angularly about the axis of said spindle in response to rotation of said adjusting members together with each other; and transmission means for selectively rotating said adjusting members, said transmission means including a motor and a pair of clutches one of which is operative when the motor drives said adjusting members relative to each other and the other of which is operative when the motor drives said adjusting members together with each other.

3. A balancing apparatus for rotating elements, comprising a rotatable system including a hollow spindle and a carrier defining an internal chamber and coaxially secured to one end of said spindle a balancing mass received in said chamber and having a center of gravity movable radially and angularly with respect to the axis of said spindle, said mass being provided with a central bore of constant cross section; a first adjusting member including a rotary shaft coaxially received in said spindle; a second adjusting member including a rotary sleeve received in said spindle and coaxially receiving said shaft; motion transmitting means including a lever having a head extending into said bore and arranged to move the center of gravity of said mass radially with reference to the axis of said spindle in response to rotation of said adjusting members relative to each other and to move said center of gravity angularly about the axis of said spindle in response to rotation of said adjusting members together with each other; coupling means comprising cooperating elements provided on said lever and said sleeve for rotating said lever in response to rotation of said sleeve so that the lever then rotates about a point which is spaced from said head; cam means comprising cooperating elements provided on said lever and said shaft for changing the inclination of the axis of said lever with respect to the axis of said spindle in response to rotation of said shaft with respect to said lever or vice versa; and transmission means for selectively rotating said shaft and said sleeve together with or relative to each other.

4. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with respect to the axis of said spindle, said mass being provided with a central cylindrical bore of constant diameter; a first adjusting member including a rotary shaft coaxially received in said spindle; a second adjusting member including a rotary sleeve received in said spindle and coaxially receiving said shaft; motion transmitting means including a lever having a spherical head extending into said bore and arranged to move the center of gravity of said mass radially with reference to the axis of said spindle in response to rotation of said adjusting members relative to each other and to move said center of gravity angularly about the axis of said spindle in response to rotation of said adjusting members together with each other; coupling means comprising cooperating elements provided on said lever and said sleeve for rotating said lever in response to rotation of said sleeve so that the lever then rotates about a point which is spaced from said head; cam means comprising cooperating elements provided on said lever and said shaft for changing the inclination of the axis of said lever with respect to the axis of said spindle in response to rotation of said shaft with respect to said lever or vice versa; and transmission means for selectively rotating said shaft and said sleeve together with or relative to each other.

5. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with respect to the axis of said spindle, said mass being provided with a central bore of constant cross section bounded by a polygonal surface having a plurality of facets; a first adjusting member including a rotary shaft coaxially received in said spindle; a second adjusting member including a rotary sleeve received in said spindle and coaxially receiving said shaft; motion transmitting means including a lever having a polygonal head extending into said bore and arranged to move the center of gravity of said mass radially with reference to the axis of said spindle in response to rotation of said adjusting members relative to each other and to move said center of gravity angularly about the axis of said spindle in response to rotation of said adjusting members together with each other, said head having a plurality of rounded facets each abutting against one facet of said polygonal surface so that said head is coupled for rotation with but is free to move axially and to wobble relative to said mass; coupling means comprising cooperating elements provided on said lever and said sleeve for rotating said lever in response to rotation of said sleeve so that the lever then rotates about a point which is spaced from said head; cam means comprising cooperating elements provided on said lever and said shaft for changing the inclination of the axis of said lever with respect to the axis of said spindle in response to rotation of said shaft with respect to said lever or vice versa; and transmission means for selectively rotating said shaft and said sleeve together with or relative each other.

6. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with respect to the axis of said spindle, said mass being provided with a central bore of constant cross section; a first adjusting member including a rotary shaft coaxially received in said spindle; a second adjusting member including a rotary sleeve received in said spindle and coaxially receiving said shaft; motion transmitting means including a lever having a head extending into said bore and arranged to move the center of gravity of said mass radially with reference to the axis of said spindle in response to rotation of said adjusting members relative to each other and to move said center of gravity angularly about the axis of said spindle in response to rotation of said adjusting members together with each other; coupling means comprising claws and claw-receiving grooves provided on said lever and said sleeve for rotating said lever in response to rotation of said sleeve so that the lever then rotates about a point of its axis which is spaced from said head and is located on the axis of said spindle; cam means comprising cooperating elements provided on said lever and said shaft for changing the inclination of the axis of said lever with respect to the axis of said spindle in response to rotation of said shaft with respect to said lever or vice versa; and transmission means for selectively rotating said shaft and said sleeve with or relative each other.

7. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with respect to the axis of said spindle, said mass being provided with a central bore of constant cross section; a first adjusting member including a rotary shaft coaxially received in said spindle; a second adjusting member including a rotary sleeve received in said spindle and coaxially receiving said shaft; motion transmitting means including a lever having a head extending into said bore and arranged to move the center of gravity of said mass radially with reference to the axis of said spindle in response to rotation of said adjusting members relative to each other and to move said center of gravity angularly about the axis of said spindle in response to rotation of said adjusting members together with each other; coupling means comprising cooperating elements provided on said lever and said sleeve for rotating said lever in response to rotation of said sleeve so that the lever then rotates about a point which is spaced from said head; cam means comprising cooperating elements provided on said lever and said shaft for changing the inclination of the axis of said lever with respect to the axis of said spindle in response to rotation of said shaft with respect to said lever or vice versa, said cam means including a first cam face provided on and inclined with respect to the axis of said lever and a second cam face provided on and inclined with respect to the axis of said shaft; means for holding said cam faces in abutment with each other; and transmission means for selectively rotating said shaft and said sleeve together with or relative to each other.

8. A balancing apparatus as set forth in claim 7, wherein the means for holding said cam faces in abutment with each other includes a spherical surface provided at that end of said lever which is distant from said head and a supporting member secured to said spindle and having a socket receiving said spherical surface.

9. A balancing apparatus as set forth in claim 8, wherein said supporting member is a hollow plug threadedly secured to said spindle and said carrier, said lever having a portion disposed between said head and said spherical surface and extending with play through said plug so that the lever may wobble with respect to said carrier.

10. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with respect to the axis of said spindle, said mass being provided with an axially parallel eccentrically located bore; a first adjusting member including a rotary shaft coaxially received in said spindle; a second adjusting member including a rotary sleeve received in said spindle and coaxially receiving said shaft; motion transmitting means including an eccentric rotatably received in the bore of said mass and rotatable by said shaft to move the center of gravity of said mass radially with reference to the axis of said spindle when said shaft and said sleeve rotate relative to each other, and coupling means connecting said mass for rotation with said sleeve so that said center of gravity moves angularly about the axis of said spindle when said shaft and said sleeve rotate together with each other; and transmission means for selectively rotating said shaft and said sleeve together with or relative to each other.

11. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with respect to the axis of said spindle, said mass being provided with an axially parallel eccentrically located bore; a first adjusting member including a rotary shaft coaxially received in said spindle; a second adjusting member including a rotary sleeve received in said spindle and coaxially receiving said shaft; motion transmitting means including an eccentric rotatably received in the bore of said mass, first coupling means for connecting said eccentric with said shaft to move the center of gravity of said mass radially with reference to the axis of said spindle when said shaft and said sleeve rotate relative to each other, and second coupling means connecting said mass for rotation with said sleeve so that said center of gravity moves angularly about the axis of said spindle when said shaft and said sleeve rotate together with each other, at least one of said coupling means comprising cooperating claws and claw-receiving recesses; and transmission means for selectively rotating said shaft and said sleeve together with or relative to each other.

12. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with reference to the axis of said spindle; a first adjusting member including a rotary shaft coaxially received in said spindle; a second adjusting member including a sleeve rotatably received in said spindle and coaxially surrounding said shaft; motion transmitting means operatively connected with said adjusting members and arranged to move the center of gravity of said mass radially with reference to the axis of said spindle in response to rotation of said adjusting members relative to each other and to move said center of gravity angularly about the axis of said spindle in response to rotation of said adjusting members together with each other; and transmission means for selectively rotating said adjusting members, said transmission means comprising a first planetary including a first sun gear secured to said spindle, a fixed first ring gear, and planet pinions meshing with said first gears, a second planetary including a second sun gear secured to said sleeve, a rotary second ring gear, and second planet pinions meshing with said second gears, a third planetary including a third sun gear secured to said shaft, a rotary third ring gear, and third planet pinions meshing with said third gears, and means for rotating said rotary ring gears with and relative to each other whereby said shaft and said sleeve respectively rotate together with each other and relative to each other.

13. A balancing apparatus as set forth in claim 12, wherein each of said first planet pinions is coaxially aligned with one of said second and third planet pinions, and further comprising a common planet shaft for each set of aligned planet pinions.

14. A balancing apparatus as set forth in claim 13, further comprising a planet carrier for said planet shafts, said planet carrier being rotatable on said spindle.

15. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with reference to the axis of said spindle; a first adjusting member including a rotary shaft coaxially received in said spindle; a second adjusting member including a sleeve rotatably received in said spindle and coaxially surrounding said shaft; motion transmitting means operatively connected with said adjusting members and arranged to move the center of gravity of said mass radially with reference to the axis of said spindle in response to rotation of said adjusting members relative to each other and to move said center of gravity angularly about the axis of said spindle in response to rotation of said adjusting members together with each other; and transmission means for selectively rotating said adjusting members, said transmission means comprising a first planetary including a first sun gear secured to said spindle, a fixed first ring gear, and planet pinions meshing with said first gears, a second planetary including a second sun gear secured to said sleeve, a rotary second ring gear, and second planet pinions meshing with said second gears, a third planetary including a third sun gear secured to said shaft, a rotary third ring gear, and third planet pinions meshing with said third gears, and means for rotating said rotary ring gears with and relative to each other whereby said shaft and said sleeve respectively rotate together with each other and relative to each other, said last mentioned means comprising a first and a second worm wheel respectively secured to said second and third ring gear, a first and a second worm respectively meshing with said first and second worm wheel, a reversible motor arranged to drive one of said worms, first clutch means for coupling said one worm with the other worm for rotation in the same direction, and second clutch means for coupling said one worm with the other worm for rotation relative to each other.

16. A balancing apparatus as set forth in claim 15, further comprising self-locking means connected with said one worm to prevent rotation of said rotary ring gears when said motor is idle.

17. A balancing apparatus as set forth in claim 15, wherein each of said clutch means is an electromagnetic clutch and further comprising a worm shaft for each of said worms, said worm shafts being parallel to each other and each of said clutch means comprising a first clutch element freely rotatable on the worm shaft of said one worm and a second clutch element secured for rotation with the worm shaft of said one worm, said second clutch elements being energizable at the will of the operator to rotate the respective first clutch elements in response to rotation of said one worm.

18. A balancing apparatus as set forth in claim 17, further comprising a first gear secured to the first clutch element to one of said clutch means and a second gear secured to the worm shaft of said other worm, said first and second gears meshing with each other to rotate said other worm in a clockwise direction when said one worm rotates in a counterclockwise direction and when the second clutch element of said one clutch means is energized.

19. A balancing apparatus as set forth in claim 18, further comprising a first gear member secured to the first clutch element of the other clutch means, a second gear member secured to the worm shaft of said other worm, and an intermediate gear member meshing with said first and second gear member to rotate said other worm in the direction in which said one worm is rotated by said motor when the second clutch element of said other clutch means is energized.

20. A balancing apparatus as set forth in claim 17, further comprising a worm wheel mounted on the worm shaft of said one worm and a worm driven by said motor and meshing with said last mentioned worm wheel.

21. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with reference to the axis of said spindle; a first adjusting member including a rotary shaft coaxially received in said spindle; a second adjusting member including a sleeve rotatably received in said spindle and coaxially surrounding said shaft; motion transmitting means operatively connected with said adjusting members and arranged to move the center of gravity of said mass radially with reference to the axis of said spindle in response to rotation of said adjusting members relative to each other and to move said center of gravity angularly about the axis of said spindle in response to rotation of said adjusting members together with each other; and transmission means for selectively rotating said adjusting members at identical speeds, said transmission means comprising a first planetary including a first sun gear secured to said spindle, a fixed first ring gear, and first planet pinions meshing with said first gears, a second planetary including a second sun gear secured to said sleeve, a rotary second ring gear, and second planet pinions meshing with said second gears, a third planetary including a third sun gear secured to said shaft, a rotary third ring gear, and third planet pinions meshing with said third gears, and means for rotating said rotary ring gears with and relative to each other whereby said shaft and said sleeve respectively rotate together with each other and relative to each other.

22. A balancing apparatus for rotating elements, comprising a rotatable system including a hollow spindle and a carrier defining an internal chamber and coaxially secured to one end of said spindle; drive means for rotating said spindle and said carrier; a balancing mass received in said chamber and having a center of gravity movable radially and angularly with reference to the axis of said spindle; a first adjusting member including a rotary shaft coaxially received in said spindle; a second adjusting member including a sleeve rotatably received in said spindle and coaxially surrounding said shaft; motion transmitting means operatively connected with said adjusting members and arranged to move the center of gravity of said mass radially with reference to the axis of said spindle in response to rotation of said adjusting members relative to each other and to move said center of gravity angularly about the axis of said spindle in response to rotation of said adjusting members together with each other; and transmission means for selectively rotating said adjusting members, said transmission means comprising a first planetary including a first sun gear secured to said spindle, a fixed first ring gear, and first planet pinions meshing with said first gears, a second planetary including a second sun gear secured to said sleeve, a rotary second ring gear, and second planet pinions meshing with said second gears, a third planetary including a third sun gear secured to said shaft, a rotary third ring gear, and third planet pinions meshing with said third gears, and means for rotating said rotary ring gears with and relative to each other whereby said shaft and said sleeve respectively rotate together with each other and relative to each other.

23. A balancing apparatus for rotating elements, comprising a rotatable system including a hollow spindle and a carrier defining an internal chamber and coaxially secured to one end of said spindle; a balancing mass received in said chamber and having a center of gravity movable radially and angularly with reference to the axis of said spindle; a first adjusting member including a rotary shaft coaxially received in said spindle; a second adjusting member including a rotary sleeve received in said spindle and coaxially receiving said shaft; motion transmitting means operatively connected with said adjusting members and arranged to move the center of gravity of said mass radially with reference to the axis of said spindle in response to rotation of said adjusting members relative to each other and to move said center of gravity angularly about the axis of said spindle in response to rotation of said adjusting members together with each other; and transmission means for selectively rotating said adjusting members, said transmission means including a motor and a pair of clutches one of which is operative when the motor drives said adjusting members together with each other and the other of which is operative when the motor drives said adjusting members relative to each other, said clutches being arranged to prevent rotation of said adjusting means in response to operation of said motor when each thereof is operative.

24. A balancing apparatus for rotating elements, comprising a rotatable system including an elongated hollow spindle having an end portion, a carrier detachably secured to the end portion of said spindle and defining an internal chamber, and a rotary element coaxially secured to and surrounding said end portion of said spindle, said rotary element being separable from said end portion upon detachment of said carrier; a balancing mass received in said chamber and having a center of gravity movable radially and angularly with reference to the axis of said spindle to thereby statically balance said rotatable system; first and second adjusting means coaxially received in said spindle and having end portions adjacent to the end portion of said spindle; motion transmitting means received in the end portion of said spindle and operatively connected with the end portions of said adjusting means so as to move the center of gravity of said mass radially with reference to the axis of said spindle in response to rotation of said adjusting means relative to each other and to move said center of gravity angularly about the axis of said spindle in response to rotation of said adjusting means together with each other; and transmission means for rotating said adjusting means together with or relative to each other.

25. A balancing apparatus for rotating elements, comprising a rotatable system including an elongated hollow spindle having an end portion, a carrier detachably secured to the end portion of said spindle and defining an internal chamber having an open end distant from the end portion of said spindle, cover means detachably secured to said carrier to close the open end of said chamber and comprising window means to permit observation of the chamber, and a rotary element coaxially secured to and surrounding said end portion of said spindle, said rotary element being separable from said end portion upon detachment of said carrier; a balancing mass received in said chamber and having a center of gravity movable radially and angularly with reference to the axis of said spindle to thereby statically balance said rotatable system; first and second adjusting means coaxially received in said spindle and having end portions adjacent to the end portion of said spindle; motion transmitting means received in the end portion of said spindle and operatively connected with the end portions of said adjusting means so as to move the center of gravity of said mass radially with reference to the axis of said spindle in response to rotation of said adjusting means relative to each other and to move said center of gravity angularly about the axis of said spindle in response to rotation of said adjusting means together with each other; and transmission means for rotating said adjusting means either together with or relative to each other.

References Cited by the Examiner

UNITED STATES PATENTS

| | | | |
|---|---|---|---|
| 2,547,435 | 4/1951 | Bouchard | 180—43 |
| 3,088,335 | 5/1963 | Bullard | 74—675 |
| 3,177,738 | 4/1965 | Achilles | 74—573 |

BROUGHTON G. DURHAM, *Primary Examiner.*

W. S. RATLIFF, *Assistant Examiner.*